(12) United States Patent
Chmelar (10) Patent No.: US 8,432,250 B2
(45) Date of Patent: Apr. 30, 2013

(54) PROCESS VARIATION BASED MICROCHIP IDENTIFICATION

(75) Inventor: Erik V. Chmelar, Midland, MI (US)

(73) Assignee: LSI Corporation, San Jose, CA (US)

(*) Notice: Subject to any disclaimer, the term of this patent is extended or adjusted under 35 U.S.C. 154(b) by 1096 days.

(21) Appl. No.: 12/059,040

(22) Filed: Mar. 31, 2008

(65) Prior Publication Data
US 2009/0243792 A1 Oct. 1, 2009

(51) Int. Cl.
*G06F 7/04* (2006.01)

(52) U.S. Cl.
USPC ...................................... 340/5.6; 324/750.15

(58) Field of Classification Search .................... 340/5.6; 324/750.15; 713/189; 702/64, 117; 708/250, 708/253, 256; 380/277, 23, 44–47
See application file for complete search history.

(56) References Cited

U.S. PATENT DOCUMENTS

| | | | | |
|---|---|---|---|---|
| 4,853,884 | A * | 8/1989 | Brown et al. ...................... | 708/3 |
| 5,613,001 | A * | 3/1997 | Bakhoum ...................... | 380/254 |
| 6,161,213 | A * | 12/2000 | Lofstrom ................. | 324/750.15 |
| 2005/0041803 | A1* | 2/2005 | Chateau et al. ................. | 380/46 |
| 2006/0236123 | A1* | 10/2006 | Barr ............................. | 713/189 |

OTHER PUBLICATIONS

S. Runyon, "Startup points way to IC fingerprints", EE Times, Feb. 2000, 4 pages.
K. Lofstrom et al., "IC Identification Circuit using Device Mismatch", IEEE Int. Solid-State Circuits Conf., 2000, 2 pages.
K. Lofstrom et al., "ICID,—Tracing Individual Die from Wafer Test through End-of-Life", 10$^{th}$ Annual Int. Mixed-Signals Testing Workshop, pp. 20-29, Jun. 2004.
Nikoozadeh et al., "An Analysis of Latch Comparator Offset Due to Load Capacitor Mismatch", IEEE Trans. on Circuits and Systems-II: Express Briefs, vol. 53, No. 12, Dec. 2006, accepted for future publication, pp. 1398-1402.
Lee et al., "Low-Power Area-Efficient High-Speed I/O Circuit Techniques", IEEE Journal on Solid-State Circuits, vol. 35, No. 11, Nov. 2000, pp. 1591-1599.

* cited by examiner

*Primary Examiner* — Edwin Holloway, III
(74) *Attorney, Agent, or Firm* — Christopher P. Maiorana, PC

(57) ABSTRACT

An apparatus comprising a multiplexer circuit, a plurality of bit generation circuits, and a control circuit. The multiplexer circuit may be configured to generate an intermediate signal in response to (i) a plurality of input bits and (ii) a control signal. The plurality of bit generation circuits may each be configured to generate one of the plurality of input bits. The control circuit may be configured to generate the control signal.

16 Claims, 13 Drawing Sheets

Vt PROBABILITY DISTRIBUTION (CONVENTIONAL)

Vt top < Vt bottom

LEFT=RIGHT=0; OUT=0

(a)

LEFT=1, RIGHT=0; OUT=0

(b)

LEFT=0, RIGHT=1; OUT=?

|  T | 1 | 2 | 3 | 4 | 5 | 6 | 7 | 8 | 9 | 10 |
|---|---|---|---|---|---|---|---|---|---|---|
| C1 | 2 | 34 | 6 | 88 | 50 | 100 | 9 | 40 | 3 | 97 |
| C2 | 9 | 12 | 4 | 89 | 6 | 72 | 15 | 34 | 0 | 99 |
| MASK | 1 | 0 | 1 | 0 | 0 | 0 | 0 | 0 | 1 | 1 |

N=100

0 0 0 1

MASK EXAMPLE (T = 10, K = 4, N = 100)

FIG. 12

1. [MASK_2, MESSAGE_ENCRYPTED_WITH_KEY_2]

SENDER
(KEY_1, MASK_1)
(KEY_2, MASK_2)
⋮
(KEY_Q, MASK_Q)

MICROCHIP
(KEY_2)

2A. USE MASK TO GET MY KEY
2B. TRY TO DECRYPT MESSAGE WITH MY KEY
   IF ENCRYPTS, MESSAGE WAS FOR ME
   IF DOESN'T ENCRYPT, MESSAGE NOT
   FOR ME

MESSAGE ENCRYPTED WITH MASK

FIG. 13

PROCESS VARIATION BASED MICROCHIP IDENTIFICATION

FIELD OF THE INVENTION

The present invention relates to microchip identification generally and, more particularly, to a method and/or apparatus for implementing a process variation based microchip identification system.

BACKGROUND OF THE INVENTION

Semiconductor chips often need to have a unique identification (or identifier) marker. The identifier can be used to (i) restrict or allow access to content or services, (ii) track chip location or movement, (iii) determine a particular lot and wafer information for failure analysis, and (iv) encrypt or decrypt secure content. The first three examples are used where the chip provides an identity in response to a query. The identifier is sometimes referred to as an ID. Requesting an ID of a chip is called authentication. The last is an example where the chip uses an identifier to encrypt or decrypt a message and does not share the identifier with the requesters. The identifier in such an implementation is sometimes called a key. In both cases the identifier is a string of bits.

A good identifier should (i) be unique, or have a near-zero probability that another chip exists with the same identifier, and (ii) be invariant to temperature, voltage, noise, age, and any other parameters that can be altered. Specifically, for a good identifier every time the identifier is requested, the value generated should be the same.

An identifier can be a random or pseudo random number, an assigned number, or a mapping of carriers through the assembly-test operation. An identifier can be placed on the chip by laser trimming, bar coding, ink marking, or programming an EPROM or nonvolatile memory (as discussed in S. Runyon, "Startup points way to IC Fingerprints," *EE Times*, February 2000.). However, such techniques use expensive machinery and/or implement additional processing and/or programming steps. Additionally, such techniques yield an identifier that may (i) not be electronically readable, (ii) be alterable, and/or (iii) be forgeable.

An identifier can be derived from the mismatches that occur between fabricated transistors. With proper circuitry such an identifier could be read electronically. Such an identifier is almost impossible to alter or forge. Finally, the same circuitry can be used on every chip to generate a unique identifier for each, eliminating expensive machinery and programming steps required for other identifiers.

As transistor dimensions are continually reduced with new fabrication process technologies, the variation in transistor behavior increases. Threshold voltage Vt for a given transistor (i.e., approximately the voltage at which a conducting channel forms beneath the gate) is a random variable approximately Gaussian with $\mu Vt$ and $\sigma Vt$. The generally accepted Pelgrom's model states that the standard deviation of the threshold voltage ($\sigma Vt$), increases as transistor dimensions decrease, as shown by the following equation EQ1:

$$\sigma Vt = \frac{K}{\sqrt{L \times W}} \quad \text{EQ1}$$

Figure 1:
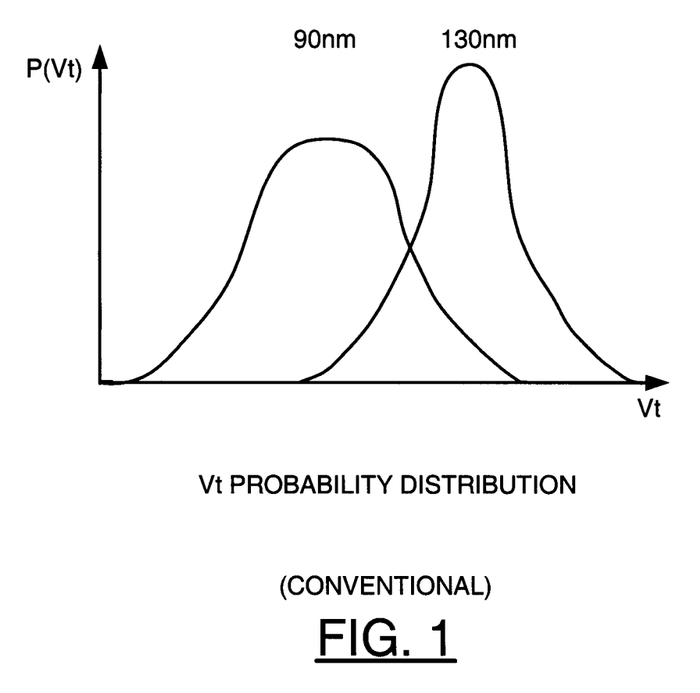
FIG. 1 is a graph illustrating a diagram of a voltage threshold probability distribution.

K is an empirically determined value and L and W are transistor length and width, respectively. Therefore, with each subsequent improvement in process technology, the specific threshold voltage Vt for a given transistor is becoming less controllable, as shown in FIG. 1. Consequently, two fabricated transistors that are designed to have identical Vt values most likely do not.

The basic idea to use Vt mismatch to generate an identifier is to fabricate an array of minimum-sized transistors (because they are most susceptible to process variation) and measure or detect the Vt mismatches. A company SiiDTech, based in Hillsboro, Oreg., in partial collaboration with, and licensed by, LSI Corporation, manufactures such a system.

Figure 2:
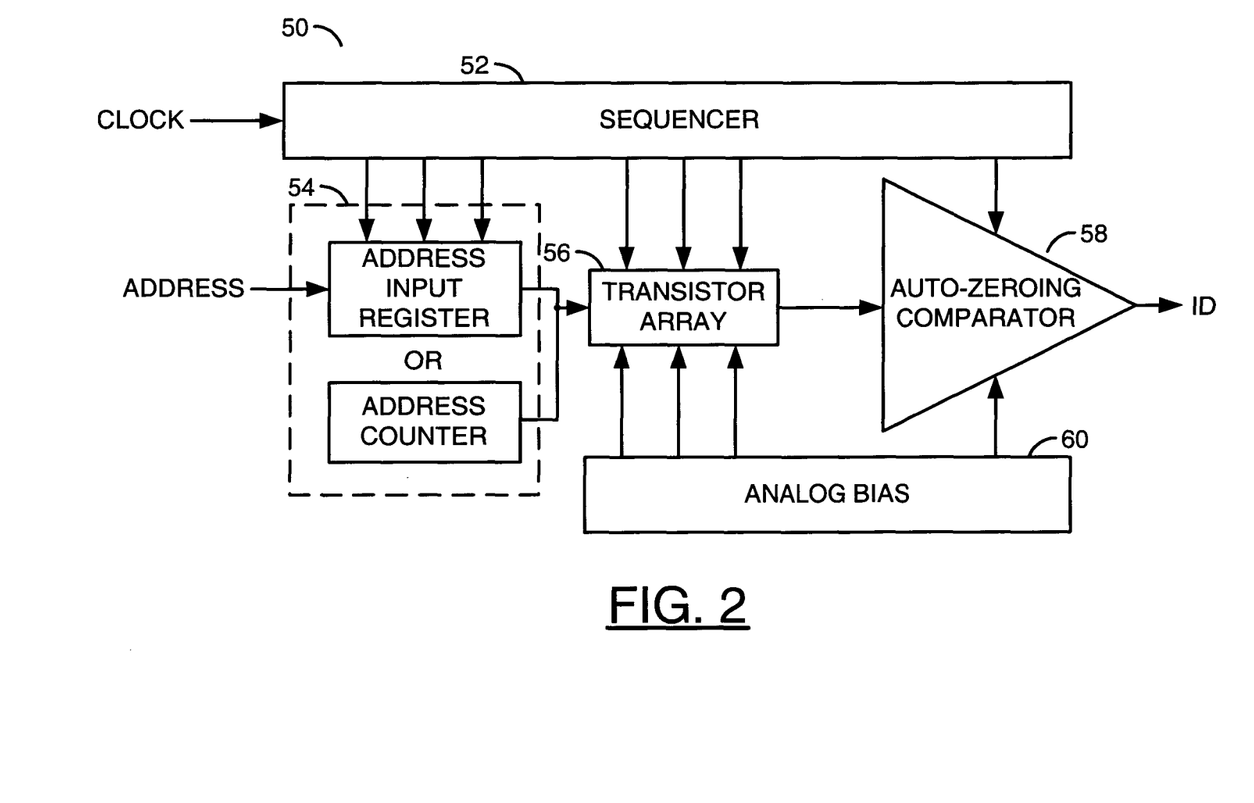
FIG. 2 is a block diagram illustrating a conventional system.

Referring to FIG. 2, such a system 50 is shown. The system 50 is shown with a sequencer circuit 52, an input circuit 54, a transistor array 56, an auto-zeroing comparator 58, and an analog bias circuit 60. The transistor array 56 is a two-dimensional array of 224 field-effect biased transistor pairs. Switching circuitry is implemented to sequentially select the outputs of one of the pairs to feed to the auto-zeroing comparator 58 (see (i) K. Lofstrom, R. Daasch, and D. Taylor, "IC identification circuit using device mismatch," IEEE Int. Solid-State Circuits Conf., 2000 and (ii) K. Lofstrom, D. Castaneda, B. Graff, and A. Cabbibo, "ICID,—tracing individual die from wafer test through end-of-life," 10th Annual Int. Mixed-Signals Testing Workshop, pp. 20-28, June 2004.). The auto-zeroing comparator 58 presents either a logic 0 or a logic 1, depending on the voltage threshold Vt mismatch in the selected transistor pair. The system 50 was fabricated in a 0.13 µm process technology and yielded unique identifiers with 1-5% of the 224 bits being unpredictable.

To generate a device ID, where approximate matching can be used, the above system performs fairly well. However, to generate a key suitable for use in cryptography, where a match in every bit of the key is needed, the system 50 will not work due to the accuracy limitations described. In particular, the system 50 uses the auto-zeroing comparator 58 to detect the Vt mismatch between a pair of transistors of the array 56. The auto-zeroing (or calibrating) comparator 58, as well as the transistor cell array 56, relies on analog signals from the analog bias circuit 60.

It would be desirable to implement a system for generating an identifier that is unique, resilient, predictable and accurate enough to be usable in authentication and/or encryption systems.

SUMMARY OF THE INVENTION

The present invention concerns an apparatus comprising a multiplexer circuit, a plurality of bit generation circuits, and a control circuit. The multiplexer circuit may be configured to generate an intermediate signal in response to (i) a plurality of input bits and (ii) a control signal. The plurality of bit generation circuits may each be configured to generate one of the plurality of input bits. The control circuit may be configured to generate the control signal.

The objects, features and advantages of the present invention include providing a chip identification that may (i) be implemented using standard digital cells, (ii) generate bits of the identifier that are predictable and/or stable, (iii) generate bits that are invariant in the presence of constant and/or fluctuating environmental parameters such as noise, temperature, and/or voltage and/or (v) be implemented as a simple system with a minimal amount of components.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 3A:
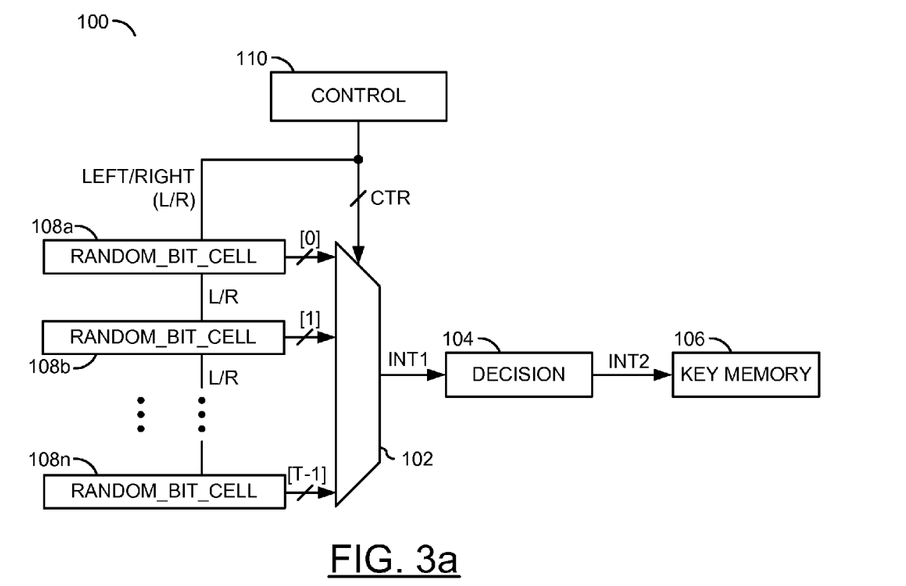
FIG. 3 is a block diagram illustrating an overview of the present invention.

Referring to FIG. 3a, a diagram of a system 100 is shown in accordance with a preferred embodiment of the present invention. The system 100 generally comprises a block (or circuit) 102, a block (or circuit) 104, a block (or circuit) 106, a number of blocks (or circuits) 108a-108n, and a block (or circuit) 110. The circuit 102 may be a logical representation of a multiplexer circuit. The circuit 104 may be implemented as a decision circuit. The circuit 106 may be implemented as a memory. The circuits 108a-108n may be implemented as bit generation circuits. The circuit 110 may be implemented as a control circuit. The circuit 102 may multiplex many signals (e.g., [0]-[T-1]) received from the circuits 108a-108n into a signal (e.g., INT1). The signal INT1 may be a multiplexed signal comprising a plurality of bits. The circuit 102 may be have a variety of implementations. In one example, the circuit 102 may be partially distributed within the bit cells 108a-108n. The decision circuit 104 may receive the signal INT1 and present a signal (e.g., INT2). The decision circuit 104 normally accepts or rejects each bit of the signal INT1 in response to one or more predetermined criterion (to be described in connection with FIGS. 4-13). The circuit 106 may receive the signal INT2. The signal 106 may be a memory circuit configured to store the signal INT2 (e.g., a key) generated by the circuit 104.

Figure 3B:
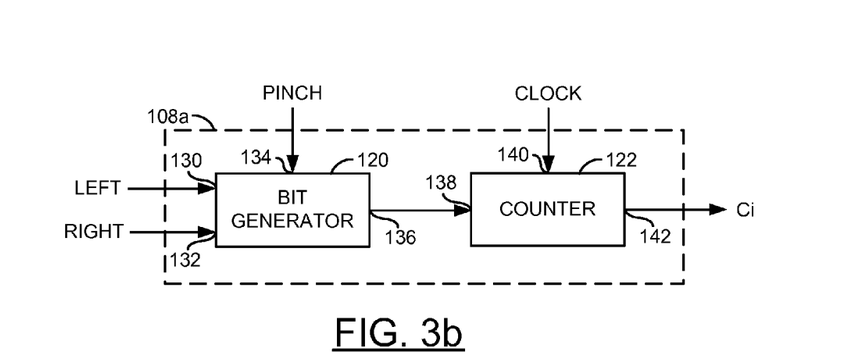

Referring to FIG. 3b, a more detailed diagram of one of the circuits 108a-108n (e.g., the circuit 108a) is shown. The circuit 108a illustrates a logical representation of a single random bit cell. The other circuits 108b-108n may have similar implementations. The circuit 108a generally comprises a block (or circuit) 120 and a block (or circuit) 122. The circuit 120 may be implemented as a bit generator circuit. Since a number of circuits 108a-108n are normally implemented, a number of bit generator circuits 120a-120n may also be implemented.

The circuit 122 may be implemented as a counter circuit. The bit generator circuit 120 may be implemented as a circuit having an output that may be determined by a voltage threshold (e.g., Vt) mismatch between two or more transistors. The circuit 120 may have an input 130 that may receive a signal (e.g., LEFT), an input 132 that may receive a signal (e.g., RIGHT), an input 134 that may receive a signal (e.g., PINCH) and an output 136 that may present a signal (e.g., OUT). The circuit 122 may have an input 138 that may receive the signal OUT, and input 140 that may receive a signal (e.g., CLOCK), and an output 142 that may present a signal (e.g., Ci). The signal LEFT and the signal RIGHT may be received from the control circuit 110. In general, each of the bit generator circuits 120 may be connected to a different set of signals LEFT and RIGHT received from the control circuit 110. Since the transistors in the bit generator circuits 120 do not normally vary after fabrication, the circuit 108a will generate a consistent output each time a key is requested.

A plurality of the circuits 108a-108n may be implemented to generate a key (or ID) having a desired number of bits (e.g., K number of bits). The particular number of bits may be varied to meet the design criteria of a particular implementation. In general, one of the circuits 108a-108n may be implemented to generate each of the bits of the key. If the identifier (or key) has a length in bits equal to K, then the number of bit generators 120a-120n is normally defined as T>K, such that at least K of T are guaranteed to generate stable bits. For example, if K=100, and in the worst case 50% of bit generators 120a-120n produce unstable bits, then T≧K/50%=100/0.5=200. In general, there are T bit generators 120a-120n, and not T random bit cells. The elements within the bit generators 120a-120n, as well as the counters 122 and decision circuit 104, may be shared between the bit cells generators 120a-120n to minimize circuit area.

The system 100 may be used to generate a key suitable for encryption applications. The uniqueness of such a key is a function of the length K. In the system 100, each bit of the key is equally likely to be either 0 or 1. The probability that two keys being identical is $(1/2)^K$. As K increases, the probability that any two chips will have the same key decreases. If M chips are manufactured, such a probability may be defined by the following equation EQ2:

$$2^K > M, \; p\text{ (duplicate\_key)} \approx \left(\frac{M}{2}\right)\left(\frac{1}{2}\right)^K; \qquad \text{EQ2}$$

if M=1 million and K=100, p (duplicate_key)≈3.9×10$^{-19}$.

Figure 4A:
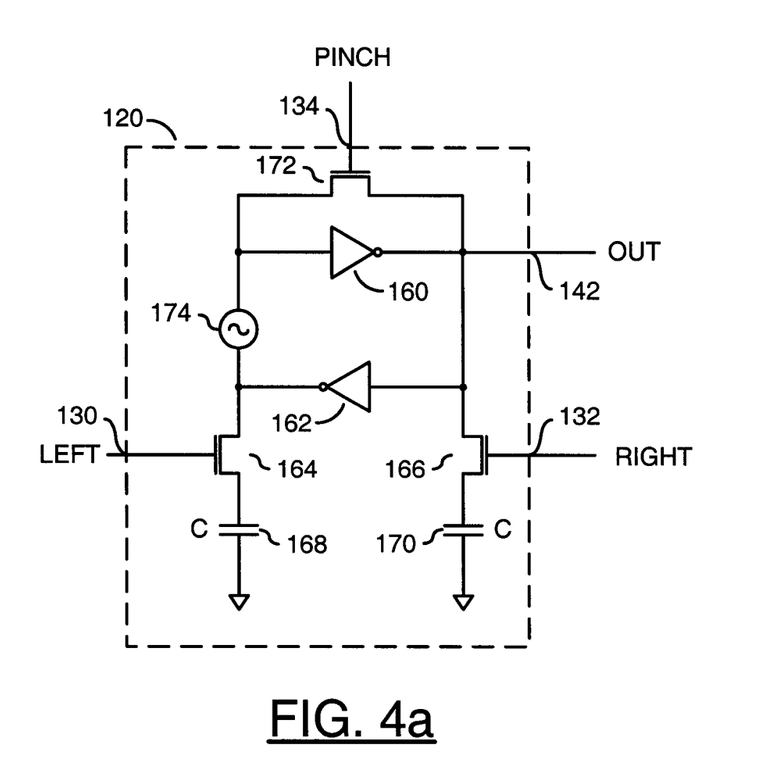
FIGS. 4a and 4b are block diagrams illustrating an example of a bit generator circuit.

Referring to FIG. 4a, an example of the bit generator circuit 120 is shown. The circuit 120 generally comprises an inverter 160, and inverter 162, a transistor 164, a transistor 166, a capacitor 168, a capacitor 170, a transistor 172, and a noise source 174. The inverter 160 and the inverter 162 may be configured as a transistor pair. The transistor 172 may be implemented as a pinch transistor configured to receive the signal PINCH. When the signal PINCH is asserted (e.g., in a digital ON state), the input and output of the inverter 160 and the inverter 162 are normally shorted (e.g., pinched) to approximately one half of a supply voltage (e.g., VDD/2). The pinch condition generally places the bit generator 120 in a metastable point. When the signal PINCH is deasserted (e.g., in a digital OFF state), the circuit 120 will tend towards a stable point, with the output of one of the inverters (e.g., 160) being driven to logic "0" and the output of the other inverter (e.g., 162) driven to logic "1". Such a structure and/or operation may be similar to an SRAM memory cell.

In general, n-channel and p-channel transistors do not behave identically as a function of temperature. For example, as temperature increases, the mobility (e.g., µ), of charge carriers in both n-channel and p-channel transistors decreases, although $\Delta\mu_n \neq \Delta\mu_p$. Thus, for a particular bit generator 120 to be stable with temperature, the output should be a function of a mismatch in Vt values between two or more n-channel transistors or two or more p-channel transistors, but not normally both.

Figure 4B:
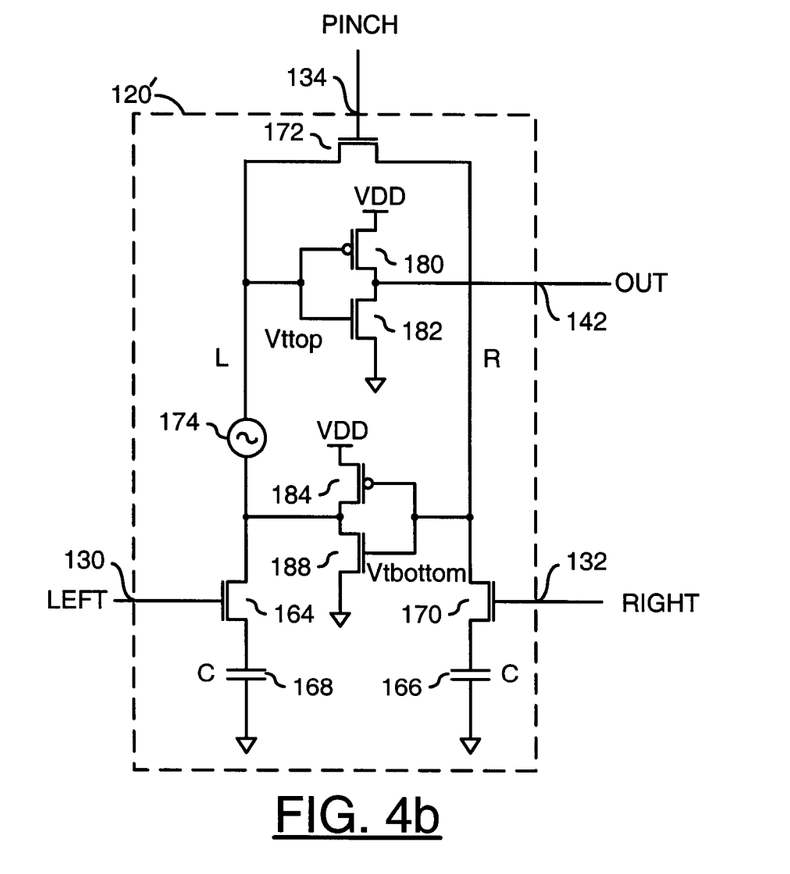
Figure 5:
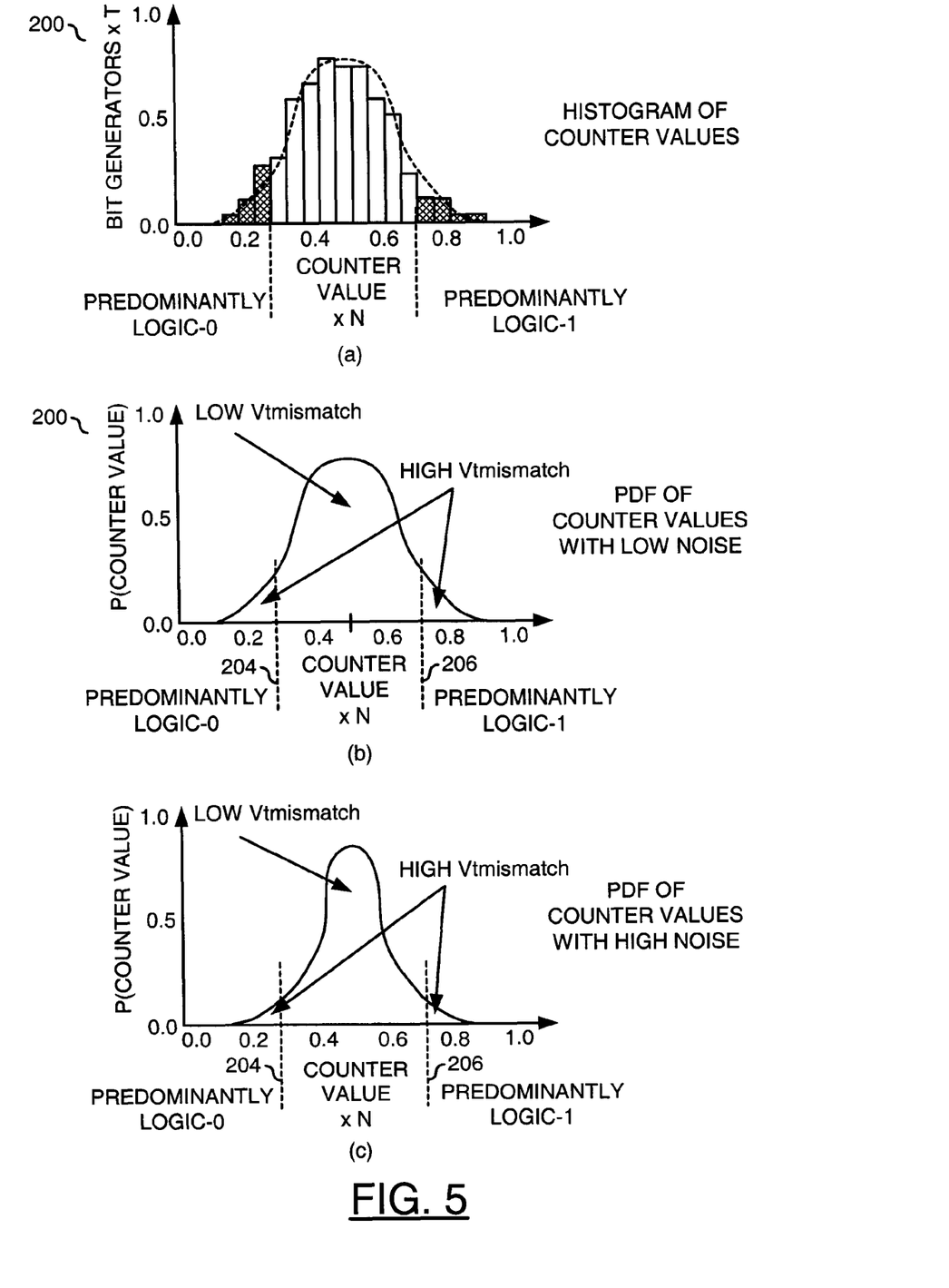
FIGS. 5a-5c are graphs illustrating various counter statistics.

Referring to FIG. 4b, a more detailed diagram of a bit generator 120' is shown. The bit generator 120' is shown implemented as a transistor level diagram. The inverter 160 is shown implemented as a transistor 180 and a transistor 182. The inverter 162 is shown implemented as a transistor 184 and a transistor 188. The transistor 180 and the transistor 184 may be implemented as p-channel transistors. The transistors 182 and the transistors 184 are shown implemented as n-channel transistors.

P-channel transistors suffer from an effect called Negative Bias Temperature Instability (NBTI), where large negative biases and elevated temperatures cause Vt to shift over time. Because n-channel transistors do not suffer from NBTI, the output of the bit generator 120 should normally be a function of a mismatch in the voltage threshold (e.g., Vtnmismatch) of the n-channel transistors if age invariance is desired. Therefore, the p-channel transistors 180 and 184 may be implemented as large-area devices. The n-channel transistors 182 and 186 may be implemented as minimum-area devices. The system 100 may be constrained as follows:

Ln=Lmin
Wn=Wmin
Lp>>Ln
Wp>>Wn
∴ σVtn>>σVtp.

Furthermore, the p-channel transistors should normally be sized to have a much lower current-carrying capacity than the n-channel transistors (e.g., IDsatp<<IDsatn). In general, the n-channel transistors dominate the transition from the metastable to a stable point of the bit generator 120.

When the signal PINCH is deasserted, the signal OUT will become either logic "0" or logic "1", depending on the mismatch in Vt values of the n-channel transistors. For example, the n-channel transistor 182 may have a threshold voltage Vttop and the n-channel transistor 188 may have a threshold voltage Vtbottom, such that Vttop>Vtbottom. With the same gate voltage VG≈VDD/2 applied to both transistors, the transistor 166 will normally achieve a stronger inversion below the gate than the transistor 180, since VG−Vtbottom>VG−Vttop. In such a case the transistor 166 will pull down the output of the inverter 162 to a logic 0 and cause the output of the bit generator 120 to become a logic 1. The transistor 172 may be implemented as a wide device with low resistance, because during steady state and given a Vtn mismatch, a current will flow through the transistor 172. If the resistance of the transistor 172 is high (e.g., enough to cause a V=IR voltage drop greater than several millivolts), the current flowing will cause a voltage drop which will affect the stable operating point of the signal OUT.

In the absence of noise, the bit generator 120 normally generates the same logic value each time the signal PINCH is deasserted (unless the voltage Vttop exactly equals the voltage Vtbottom). However, even though noise-immunity is desired, a system completely absent of noise is not normally achievable. Stability of the bit generators 120a-120n (e.g., the ability to generate the same logic value each time the signal PINCH is deasserted) is normally a function of the value Vtnmismatch (e.g., $\Delta Vtn$=|Vttop−Vtbottom|) and the amount of noise present. For example, if $\Delta Vtn$>0, which in the absence of noise would cause the output of the bit generator 120 to always be, for example, a logic 1, then an amount of noise |Vnoise|≧$\Delta Vtn$ may cause the output to become a logic 0. The output of the bit generator 120 is normally unpredictable if |Vnoise|≧$\Delta Vtn$. Since Vtn is a Gaussian random variable, then $\Delta Vtn$ is also a Gaussian random variable. To combat noise, the signal PINCH may be asserted and deasserted several times (e.g., say N times). The number of times the signal OUT is a logic 1 (or a logic 0) may be counted.

Referring to FIGS. 5a-5c, a number of diagrams are shown. FIG. 5a is a diagram illustrating a histogram 200. The histogram 200 illustrates a plot of the output of a number of the bit generators 120a-120n versus a counter value for all T of bit generators 120a-120n. The abscissa shows the counter value, where the minimum value is 0 and the maximum value is N. The histogram 200 illustrates an example in the presence of low noise. The histogram 200 may be approximated by the Gaussian curve 202 shown in FIG. 5b.

The bit generators 120a-120n that have a counter value closer to 0 or N have a larger $\Delta Vtn$ value and are generally more stable. In general, over N reads of the bit generators 120a-120n (e.g., N assertions and de-assertions of the signal PINCH), a count value near 0 normally indicates that a particular bit generator 120 predominantly reads a logic 0. A count value near N normally indicates a particular bit generator 120 predominantly reads a logic 1. The values of certain of the bit generators 120a-120n are shown to the left of a dotted line 204. The dotted line 204 is shown arbitrarily at 0.3N. The values of certain other of the bit generators 120a-120n are shown to to the right of a dotted line 206. The dotted line 206 is shown arbitrarily at 0.7N. The further the dotted lines 204 and 206 are from 0.5N, the more stable the generated key.

For example, the tails of the probability density function (PDF) may be defined as the portion of the PDF less than a×N and greater than (1×a)×N (a=03. Yielded the 30% and 70% dotted lines in the example of FIG. 5b). The determination of a is based on fabrication technology and the desired immunity of the key to noise, temperature, voltage, and/or other parameters. A bit generator 120 that has a counter 122 with a count value c<a×N predominantly presents a logic 0 (e.g., a logic-0 is stored for one bit of the key). A bit generator 120 having a counter 122 with a count value c>(1−a)×N predominantly presents a logic 1 (e.g., a logic-1 is stored for one bit of the key). A bit generator 120 with a×N≦c≦(1−a)×N does not predominantly present either a logic 0 or logic 1. Such a bit generator 120 is normally ignored and does not contribute a bit for the key. Thus, at least K of the T bit generators 120 have either c<a×N or c>(1−a)×N.

In general, the portion of the voltage Vnoise induced by noise is a Gaussian random variable. The noise source 174 illustrating the voltage Vnoise is shown in FIG. 4. |Vnoise| represents the true random or system noise. If the magnitude of the noise |Vnoise| is large, the output of the bit generator 120 will become more correlated with Vnoise and less correlated with $\Delta Vtn$. For example, an output of the bit generators 120a-120n with a small $\Delta Vtn$ compared to the noise voltage |Vnoise| will no longer depend on $\Delta Vtn$, but rather on Vnoise. The counters 122 of such bit generators 120 will store values closer to 0.5N, yielding a PDF as shown in FIG. 5c. Note that there are fewer bit generator values to the left of the dotted line 204 or to the right of the dotted line 206. Consequently, the particular bit generators 120 that are selected to contribute a bit to the key, and thus the key value, normally depend on the magnitude of the noise.

To generate a stable key that does not change when the magnitude of the noise changes, a particular bit generator 120 may be intentionally imbalanced by adding a capacitance (e.g., C), to the output of either the inverter 160 or the inverter 162. The capacitor 168 is shown gated by the transistor 164.

The capacitor 170 is shown gated by the transistor 170. The capacitor 168 is normally connected when the signal LEFT is asserted. The capacitor 170 is normally connected when the signal RIGHT is asserted. In general, there is no reason to simultaneously connect both the capacitor 168 and the capacitor 170 to the bit generator 120.

In a 0.18 μm CMOS latch (cross-coupled inverter pair like that of FIG. 4), a load imbalance of only 1 fF can result in an offset of several tens of millivolts. With typical σVt values on the order of 30 mV for a 90 nm process, reasonable capacitor values of several femtofarads can be used. Capacitive imbalance, often called capacitive trimming, may be used in high-speed communication link receivers to compensate for offset voltage mismatches.

With the n-channel transistors dominating the p-channel transistors, the value of the output of the bit generator 120 is determined by which of the n-channel transistor 164 and 166 will succeed in pulling down the output of the corresponding inverter 160 or 162. A voltage discharge of a capacitive circuit node is described by the following exponential decay equation EQ3:

$$V_{DD} \times \exp\left(-\frac{t}{RC}\right), \quad \text{EQ3}$$

where t is time, R is resistance, and C is capacitance.

Similarly, a voltage charge of a capacitive circuit node is described by equation the following exponential decay equation EQ4:

$$V_{DD}\left(1 - \exp\left(-\frac{t}{RC}\right)\right) \quad \text{EQ4}$$

A larger capacitance C normally results in a slower voltage discharge (or slower voltage charge).

Figure 6:
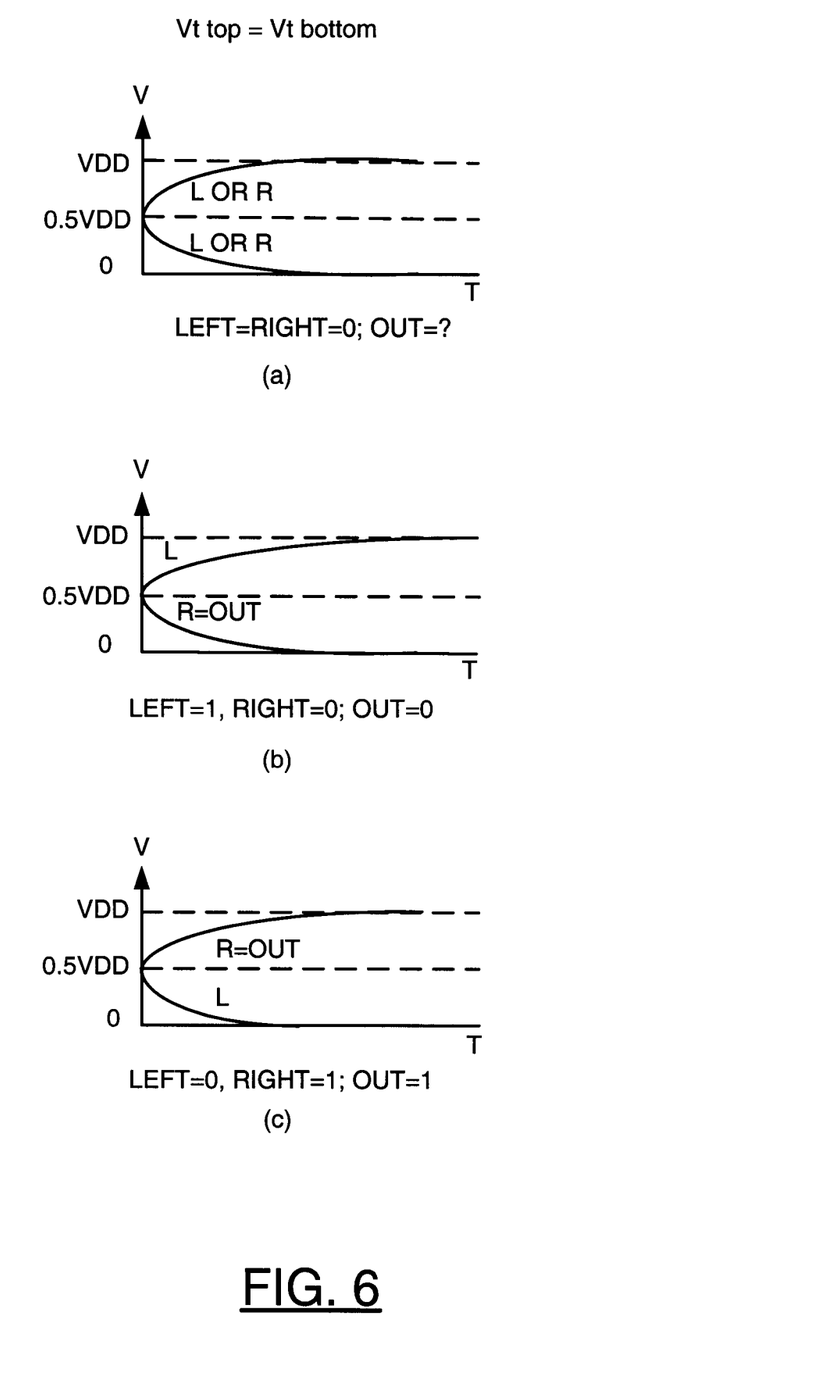
FIGS. 6a-6c are graphs illustrating Vttop equal to Vtbottom.
Figure 7:
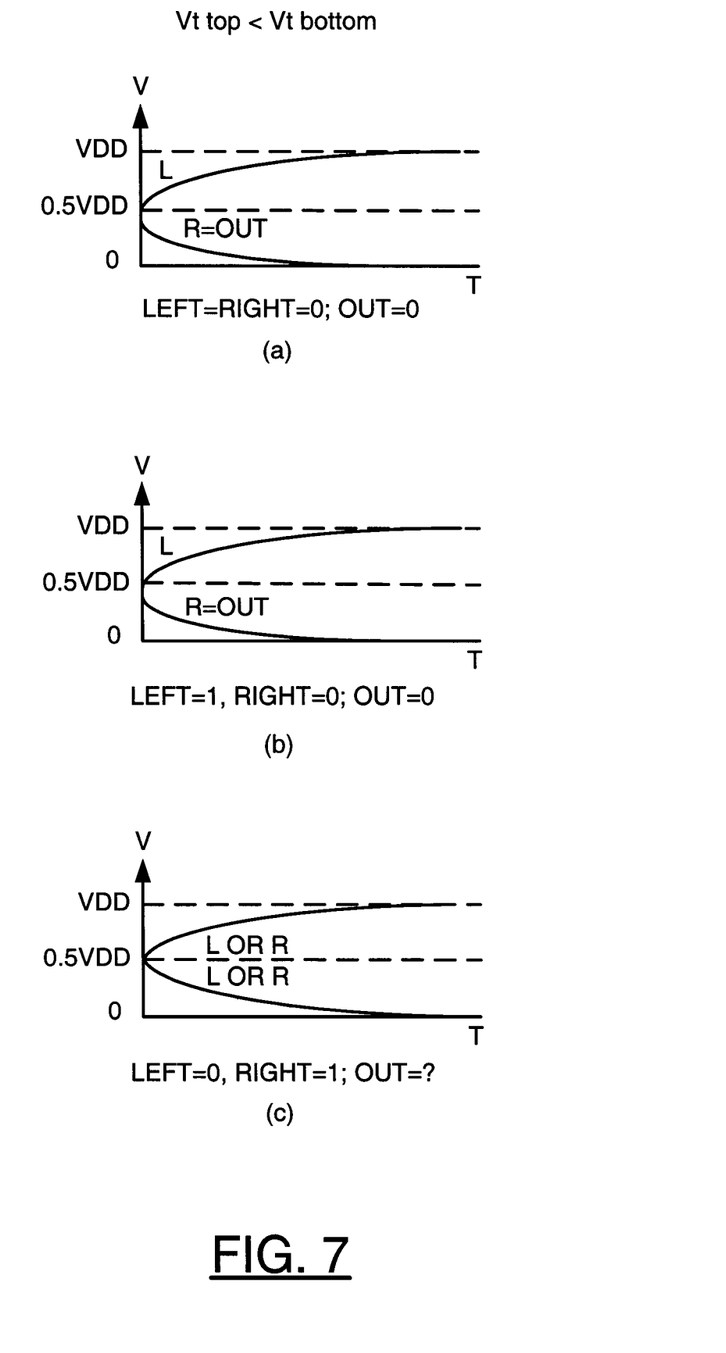
FIGS. 7a-7c are graphs illustrating Vttop less than Vtbottom.
Figure 8:
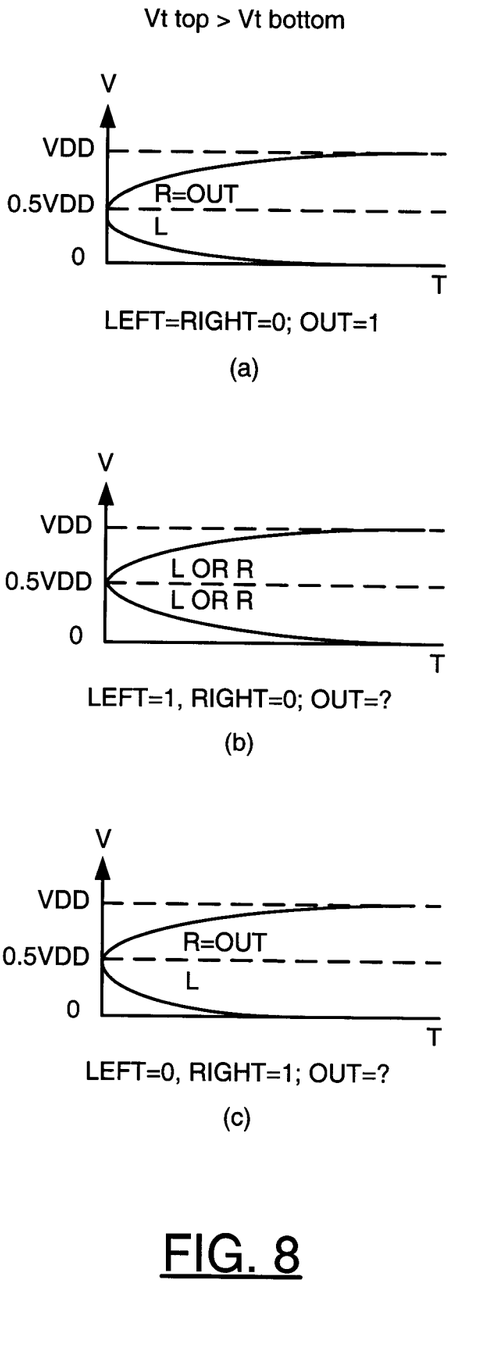
FIGS. 8a-8c are graphs illustrating Vttop greater than Vtbottom.

Referring to FIGS. 6-8, a number of graphs are shown. As shown in FIG. 6, for the bit generator 120, if Vttop=Vtbottom as shown, the circuit node with less capacitance (e.g., R) if the signal LEFT=1, or if the signal RIGHT=1, will normally be pulled down to a logic 0 to determine the value of the output. As shown in FIG. 7, if Vttop<Vtbottom, the circuit node R will be pulled down regardless of whether the signal LEFT is asserted. As shown in FIG. 7c, if C is large enough and the signal RIGHT is asserted, R may not be pulled down. As shown in FIG. 8, if Vttop>Vtbottom, the circuit node L will be pulled down regardless of whether the signal RIGHT is asserted. As shown in FIG. 8b, if C is large enough and the signal LEFT is asserted, L may not be pulled down. The plots of FIGS. 6, 7, and 8 are conceptual and illustrate the loading effects of the capacitors 168 and 170. In an actual implementation, the L and R nodes are normally dependent on each other (e.g., L=R), so the actual charge and discharge rates will be roughly equal with the stronger path driving the weaker.

To select a bit generator 120 with a large ΔVtn value, the value of the output for each bit generator 120 is normally compared when read with left=1, right=0, and then with left=0, right=1. If the value of output matches both times, a strong indication that the value ΔVtn for that bit generator 120 is large. The larger the capacitance C, the larger the value ΔVtn is when the outputs of successive bit generator 120 match.

Figure 9:
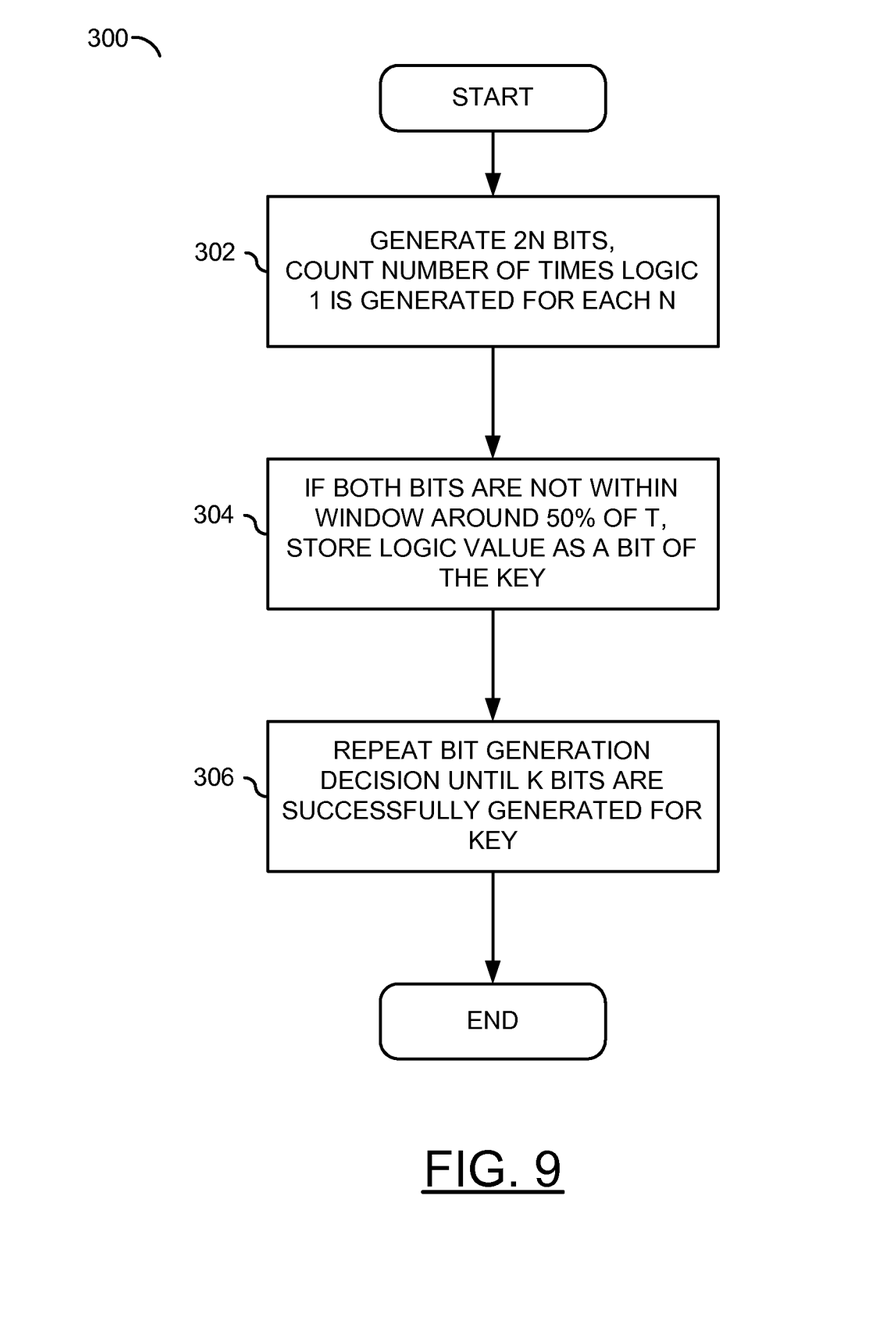
FIG. 9 is a flow chart illustrating a bit generation selection process.

Referring to FIG. 9, a method (or process) 300 for selecting the bits of the key is shown. The method 300 generally comprises a step (or state) 302, a step (or state) 304, and a step (or state) 306. The step 302 may generate 2N bits. The step 302 may then count the number of times a logic 1 is generated for each of the N bits. The step 304 may check whether both the count value C1 and the count value C2 are within a window of around 50% of T. If so, the step 304 stores the logic value as a bit of the key. The step 306 repeats the generation and count decision for additional bits until K bits have been generated for the key.

Figure 10:
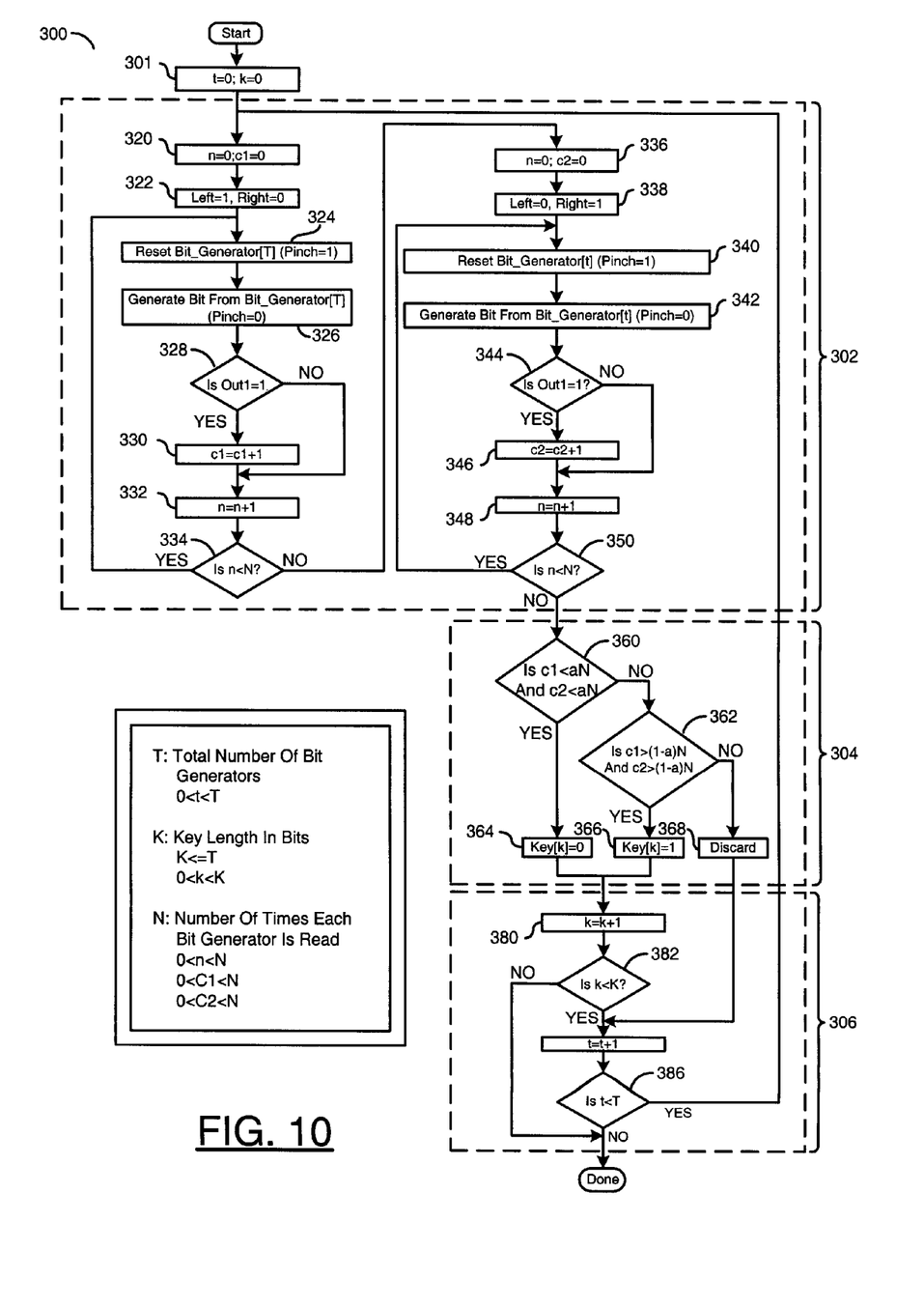
FIG. 10 is a more detailed flow chart of the bit generation selection process.

Referring to FIG. 10, a more detailed diagram of the method 300 is shown. The method 300 normally selects the first K bits having a large ΔVtn. The method 300 also includes a state 301 that initializes t=0 and k=0. The step 302 generally comprises a step (or state) 320, a step (or state) 322, a step (or state) 324, a step (or state) 326, a decision step (or state) 328, a step (or state) 330, a step (or state) 332, a decision step (or state) 334, a step (or state) 336, a step (or state) 338, a step (or state) 338, a step (or state) 340, a step (or state) 342, a decision step (or state) 344, a step (or state) 346, a step (or state) 348, and a decision step (or state) 350. The step (or state) 304 generally comprises a decision step (or state) 360, a decision step (or state) 362, a step (or state) 364, a step (or state) 366, and a step (or state) 368. The step 306 generally comprises a step (or state) 380, a decision step (or state) 382, a step (or state) 384, and a decision step (or state) 386.

The step 320 normally sets n=0 and C1=0. In the step 322, the output of a given bit generator is read N times with left=1 and right=0. In the steps 324-334, the number of times the output is logic 1 is counted and stored as the value C1. The state 336 then sets n=0 and C2=0. Next, the step 338 reads the output of the same bit generator 120 N times with left=0 and right=1. In the steps 338-348, the number of times the output is logic 1 is counted and stored as the value C2. If both the value C1 and the value C2 are less than a×N, then that bit generator 120 contributes a 0-bit to the key. If both the value C1 and the value C2 are greater than (1−a)×N, then that bit generator 120 contributes one of the bits of the key. Any other values of the value C1 and the value C2 normally cause the particular bit generator 120 not to contribute a bit to the key. Other criteria (or metrics) based on the counter values C1 and C2 may be used to select which of the bit generators 120a-120n will contribute a bit to the key (rather than simply choosing first K that have either C1<a×B and C2<a×N for logic 0 and C1>(1−a)×N and C2>(1−a)×N for logic 1). For example, the K bit generators 120a-120n with minimum C1+C2 for logic 0 or maximum C1+C2 for logic 1 may be chosen. Alternatively, the K bit generators with minimum |C1=C2| may be chosen. Other metrics may also be chosen to meet the design criteria of a particular implementation.

Additionally, the present invention may be used as a random number generator. In such an implementation, instead of selecting the bit generators 120a-120n with a large value ΔVtn, the bit generators 120a-120n with a small vale ΔVtn may be chosen. The output of these bit generators 120a-120n may be correlated with the Gaussian noise value Vnoise. The bit generators 120a-120n having counter value near 0.5N may output a value that is nearly equally likely to be either 0 or 1. Selecting K such bit generators 120a-120n may be use to yield a K-bit true random number.

Even though a particular bit generator 120 may be stable, in certain implementation, such a bit generator 120 may be equally as stable as another bit generator 120. If one or more bit generators 120 are essentially equally stable on the same logic value (e.g., both output a logic 1 most of the time), then either bit generator 120 may be selected, since either would contribute the same logic value (e.g., logic 1) to the key. A problem may arise if certain bit generators 120a-120n are essentially equally stable but on different logic values (e.g., one bit generator outputs a logic 0 most of the time and another outputs logic 1 most of the time). Both of such bit generators 120a-120n may also have equally acceptable metrics based on the count values C1 and C2. In this case, if one of the bit generators 120a-120n is selected before the other, a contribution of a particular logic value may be added to the key. In such a case, and the key would not be as invariant as desired or possible, since the value of the key would depend on which essentially equally stable bit generator happened to have a slightly better metric based on the count values C1 and C2 at a particular time.

Such issues may be solved during manufacturing tests. For example, if the key of a particular microchip is intended to be used for security (e.g., data encryption/decryption) the key must be read out at some point and stored in a database such that the key can be used to encrypt data being sent to that microchip in the field. In particular, a key for security would not be provided by the microchip to a requester in the field since such an exchange would defeat the purpose of the key. In one example, the key would be read out during manufacturing testing and provided to the customer who purchases the microchip. Also, the ability to externally read the key (e.g., through a Test Access Port (TAP)) may be disabled to ensure the key could never be read in the field by a hacker.

Figure 11:
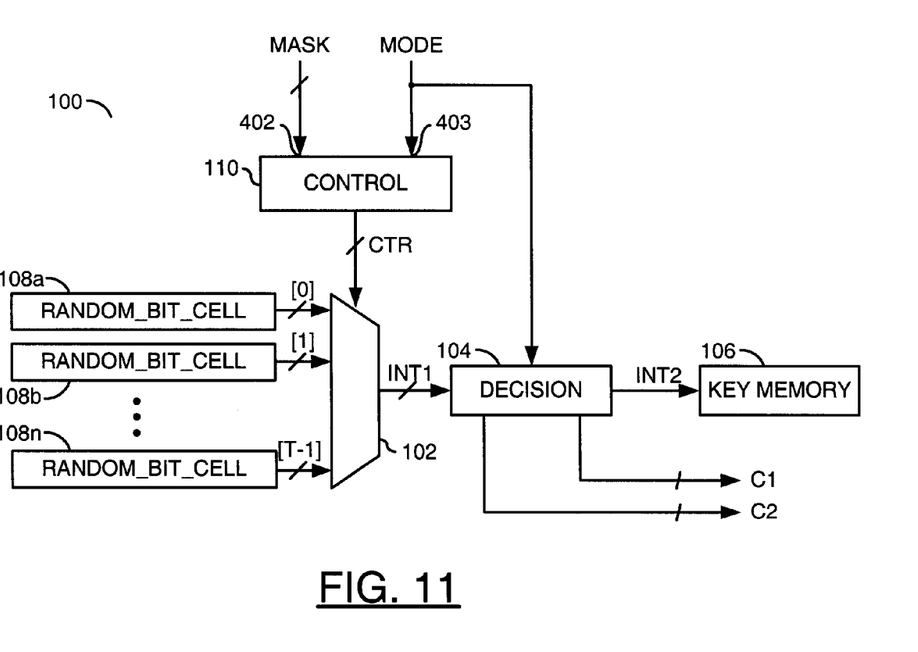
FIG. 11 is a block diagram illustrating an additional embodiment of the present invention.

Referring to FIG. 11, a system 100' is shown illustrating an alternate operation. The control circuit 110 includes an input 402 that may receive a signal (e.g., MASK) and an input 404 that may receive a signal (e.g., MODE). The signal MODE may control whether the decision block 104 presents the key or presents the counter values C1 and C2. The system 100' may also present the counter values C1 and C2 for each bit, such that a determination may be made about the degree of stability of each bit. The selection of the K bits of the T bit generators 120a-120n to use for the key may be made externally from a chip rather than internally. In such an example, the signal MASK may be generated to uniquely identify which of K of the T bits should be selected for the key based on the counter values C1 and C2. Consequently, future communication with the microchip in the field would include the value of the signal MASK, which the microchip would use to select which K of T bits to select to make up the key for decrypting the communication. Such an implementation may operate in a similar manner as a public key/private key encryption protocol. The signal MASK, even if known to a hacker, does not provide information relating to the actual value of the key.

Figure 12:
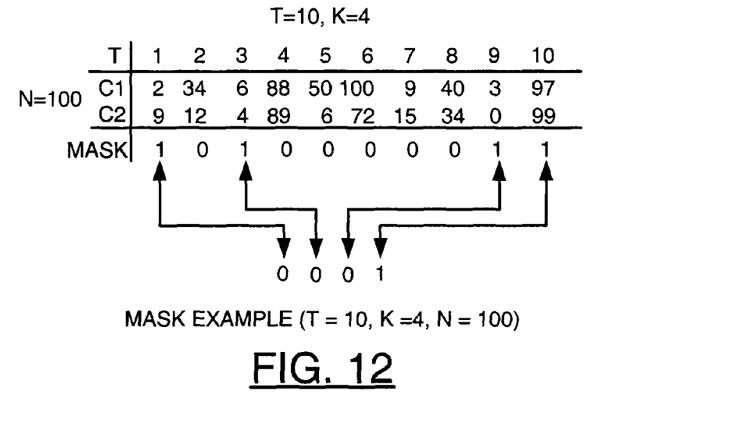
FIG. 12 is a diagram illustrating an example of a mask.

Referring to FIG. 12, an example of the signal MASK is shown. The signal MASK is shown having T bits. The signal MASK is shown and containing a 1 in each position that corresponds to a bit contributed to the key from a particular bit generator 120. In such an example some metric based on the counters values C1 and C2, and the bit generators 1, 3, 9, and 10 may contribute to the key of length K=4. The process 300 may be easily modified to accommodate such communication protocol by selecting only those bit generators 120a-120n specified by the mask (rather than selecting the first K bit generators 120a-120n with appropriate metrics).

Figure 13:
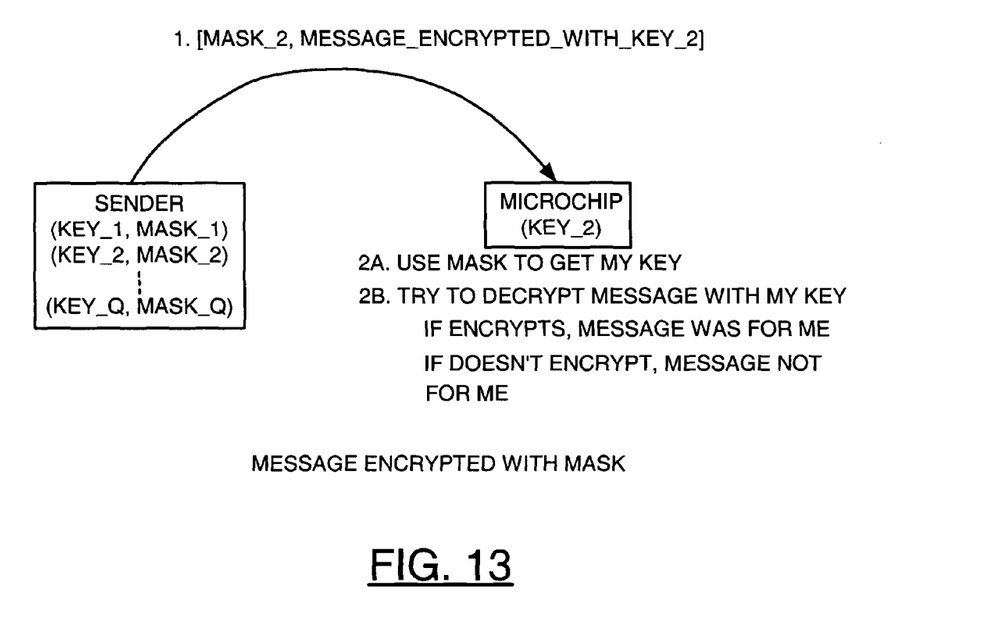
FIG. 13 is a diagram illustrating a mask used in an encryption environment.

Referring to FIG. 13, an example of how a sender would send encrypted information to the microchip is shown. To encrypt the data, the sender must know the key and mask of the recipient of the message (e.g., KEY_2 and MASK_2). The sender encrypts the message and sends the encrypted message along with the signal MASK_2 in some unencrypted portion of the message, for example in a header. The microchip (recipient) may use the mask value MASK_2, to select the bit generators 120a-120n to generate a key, and subsequently use the generated key to decrypt the message. If successful, the message was intended for that recipient. If unsuccessful, the message was not intended for that recipient.

The various signals of the present invention are generally "on" (e.g., a digital HIGH, or 1) or "off" (e.g., a digital LOW, or 0). However, the particular polarities of the on (e.g., asserted) and off (e.g., de-asserted) states of the signals may be adjusted (e.g., reversed)to meet the design criteria of a particular implementation. Additionally, inverters may be added to change a particular polarity of the signals.

The function performed by the flow diagram of FIG. 9 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMs, RAMs, EPROMs, EEPROMs, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the scope of the invention.

The invention claimed is:

1. An apparatus comprising:
    a multiplexer circuit configured to generate an intermediate signal in response to (i) a plurality of input bits and (ii) a control signal;
    a plurality of bit generation circuits each configured to generate one of said plurality of input bits, wherein (A) each of said bit generation circuits generates one of said input bits in response to (i) a first transistor signal connected to a first transistor configured to generate a first voltage threshold, (ii) a second transistor signal connected to a second transistor configured to generate a second voltage threshold, and (iii) a pinch signal, (B) each of said input bits is generated in response to a voltage mismatch between said first voltage threshold and said second voltage threshold, (C) said voltage mismatch occurs as a result of process variations during fabrication, and (D) said plurality of bit generation circuits provide a unique identification of said apparatus that does not change after fabrication; and
    a control circuit configured to generate said control signal.

2. The apparatus according to claim 1, wherein said apparatus generates said intermediate signal within a tolerance needed to be used as an encryption key.

3. The apparatus according to claim 1, wherein said first and second transistor signals are generated in response to two or more transistors used to implement various components of said apparatus.

4. The apparatus according to claim 1, further comprising:
    a decision circuit configured to generate a second intermediate signal in response to said first intermediate signal.

5. The apparatus according to claim 4, further comprising:
a memory circuit configured to receive said second intermediate signal.

6. The apparatus according to claim 4, wherein said control circuit generates said control signal in response to a mode signal, wherein said mode signal is configured to control whether said decision circuit generates (i) said intermediate signal when in a first mode and (ii) one or more counter signals configured to indicate a degree of accuracy of said apparatus when in a second mode.

7. The apparatus according to claim 1, wherein said intermediate signal comprises a multi-bit signal.

8. The apparatus according to claim 1, wherein said control circuit generates said control signal in response to a mask signal, wherein said mask signal is configured to select which of said plurality of bits is used to generate said intermediate signal.

9. A method for generating a chip identification, comprising the steps of:
(A) generating an intermediate signal in response to (i) a plurality of input bits and (ii) a control signal;
(B) generating a plurality of input bits in response to a plurality of bit generation circuits, wherein (A) each of said bit generation circuits generates one of said input bits in response to (i) a first transistor signal connected to a first transistor configured to generate a first voltage threshold, (ii) a second transistor signal connected to a second transistor configured to generate a second voltage threshold, and (iii) a pinch signal, (B) each of said input bits is generated in response to a voltage mismatch between said first voltage threshold and said second voltage threshold, (C) said voltage mismatch occurs as a result of process variations during fabrication, and (D) said plurality of bit generation circuits provide a unique identification that does not change after fabrication; and
(C) generating said control signal.

10. The method according to claim 9, wherein step (A) generates said intermediate signal within a tolerance needed to be used as an encryption key.

11. The method according to claim 9, wherein said first and second transistor signals are generated in response to two or more transistors used to implement various components of said method.

12. The method according to claim 9, further comprising:
a decision circuit configured to generate a second intermediate signal in response to said first intermediate signal.

13. The method according to claim 12, further comprising:
receiving said second intermediate signal by a memory circuit.

14. The method according to claim 9, wherein said intermediate signal comprises a multi-bit signal.

15. A method for generating a bit pattern, comprising the steps of:
(A) generating a plurality of bits;
(B) generating a first count value indicating a number of times a first digital value is generated within said plurality of bits;
(C) generating a second count value indicating a number of times a second digital value is generated within said plurality of bits;
(D) if said first count value and said second count value are within a predetermined tolerance, storing said bit pattern; and
(E) repeating steps (A) through (D) if said first count value and said second count value are not within a predetermined tolerance, wherein step (A) generates said plurality of bits in response to (i) a first transistor signal connected to a first transistor configured to generate a first voltage threshold, (ii) a second transistor signal connected to a second transistor configured to generate a second voltage threshold, and (iii) a pinch signal, (B) each of said bits is generated in response to a voltage mismatch between said first voltage threshold and said second voltage threshold, (C) said voltage mismatch occurs as a result of process variations during fabrication, and (D) said plurality of bit generation circuits provide a unique identification that does not change after fabrication.

16. The method according to claim 15, wherein said predetermined tolerance is sufficient to use said bit pattern as an encryption key.

* * * * *